United States Patent [19]
Chan et al.

[11] Patent Number: 5,721,392
[45] Date of Patent: Feb. 24, 1998

[54] PYROTECHNIC IGNITION DEVICE

[75] Inventors: Sek Kwan Chan, St Bruno, Canada; Steven John Graham, Fairlie, United Kingdom; Graeme Allan Leiper, Prestwick, United Kingdom; Moira Logan, Irvine, United Kingdom

[73] Assignees: Imperial Chemical Industries PLC, London, England; ICI Canada Inc., Ontario, Canada

[21] Appl. No.: 587,836

[22] Filed: Jan. 11, 1996

[30] Foreign Application Priority Data

Jan. 14, 1995 [GB] United Kingdom ............. 9500719
May 12, 1995 [GB] United Kingdom ............. 9509606

[51] Int. Cl.⁶ ................. C06C 5/00; C06C 45/00; C06D 5/00
[52] U.S. Cl. ............... 102/275.1; 102/284; 102/275.8; 102/275.9; 102/289
[58] Field of Search ............... 102/275.1, 275.8, 102/275.9, 530, 531, 288, 289, 284

[56] References Cited

U.S. PATENT DOCUMENTS

| | | | |
|---|---|---|---|
| 552,919 | 1/1896 | Maxim | 102/284 |
| 3,163,113 | 12/1964 | Davis et al. | 102/284 |
| 3,496,870 | 2/1970 | Fulmer | 102/284 |
| 4,013,743 | 3/1977 | Blasche, Jr. et al. | 102/289 |
| 4,408,534 | 10/1983 | Araki et al. | 102/288 |
| 4,615,270 | 10/1986 | Bell | 102/289 |
| 4,706,567 | 11/1987 | Schmid et al. | 102/284 |
| 5,208,420 | 5/1993 | Hamilton et al. | 102/531 |
| 5,253,584 | 10/1993 | Allford | 102/202.7 |
| 5,322,018 | 6/1994 | Hadden et al. | 102/284 |
| 5,351,619 | 10/1994 | Chan et al. | 102/289 |
| 5,411,290 | 5/1995 | Chan et al. | 280/737 |
| 5,415,932 | 5/1995 | Bishop et al. | 428/355 |
| 5,467,714 | 11/1995 | Lund et al. | 102/284 |
| 5,518,807 | 5/1996 | Chan et al. | 428/335 |

FOREIGN PATENT DOCUMENTS

| | | |
|---|---|---|
| 505024 | 9/1992 | European Pat. Off. . |
| 568381 | 11/1993 | European Pat. Off. . |
| 584922 | 3/1994 | European Pat. Off. . |
| 645354 | 3/1995 | European Pat. Off. . |
| 1189854 | 10/1959 | France ............. 102/284 |
| 9010611 | 9/1990 | WIPO . |
| 9010724 | 9/1990 | WIPO . |

*Primary Examiner*—Michael J. Carone
*Assistant Examiner*—Theresa M. Wesson

[57] ABSTRACT

The pyrotechnic ignition device of this invention comprises a hollow tubular coiled charge of pyrotechnic sheet material defining an ignition initiation position, the internal diameter of the charge decreasing and the wall thickness increasing over at least a portion of the charge extending from the initiation position in the direction of burning. This configuration enhances the reliability of ignition and the rate of flame development.

Preferably the adjacent plies of the coiled charge are spaced apart. The preferred coiled charge also has a portion downstream from the initiation position in the direction of burning which decreases in external diameter and wall thickness in a direction extending away from the initiation position, the configuration of this portion being effective to enhance the speed and violence of burning of a main gas-generating propellant charge ignited by the coiled charge. In the preferred device a pyrotechnic sheet comprising a substrate of oxidizing polymeric film coated with an oxidizable metal, for example magnesium, is coiled around a cruciate axial former so that the end edges define helices. Conveniently the coiled charge may be formed by winding the sheet into a right cylindrical tubular coil and pushing out the coil axially from the centre in the direction of burning.

22 Claims, 3 Drawing Sheets

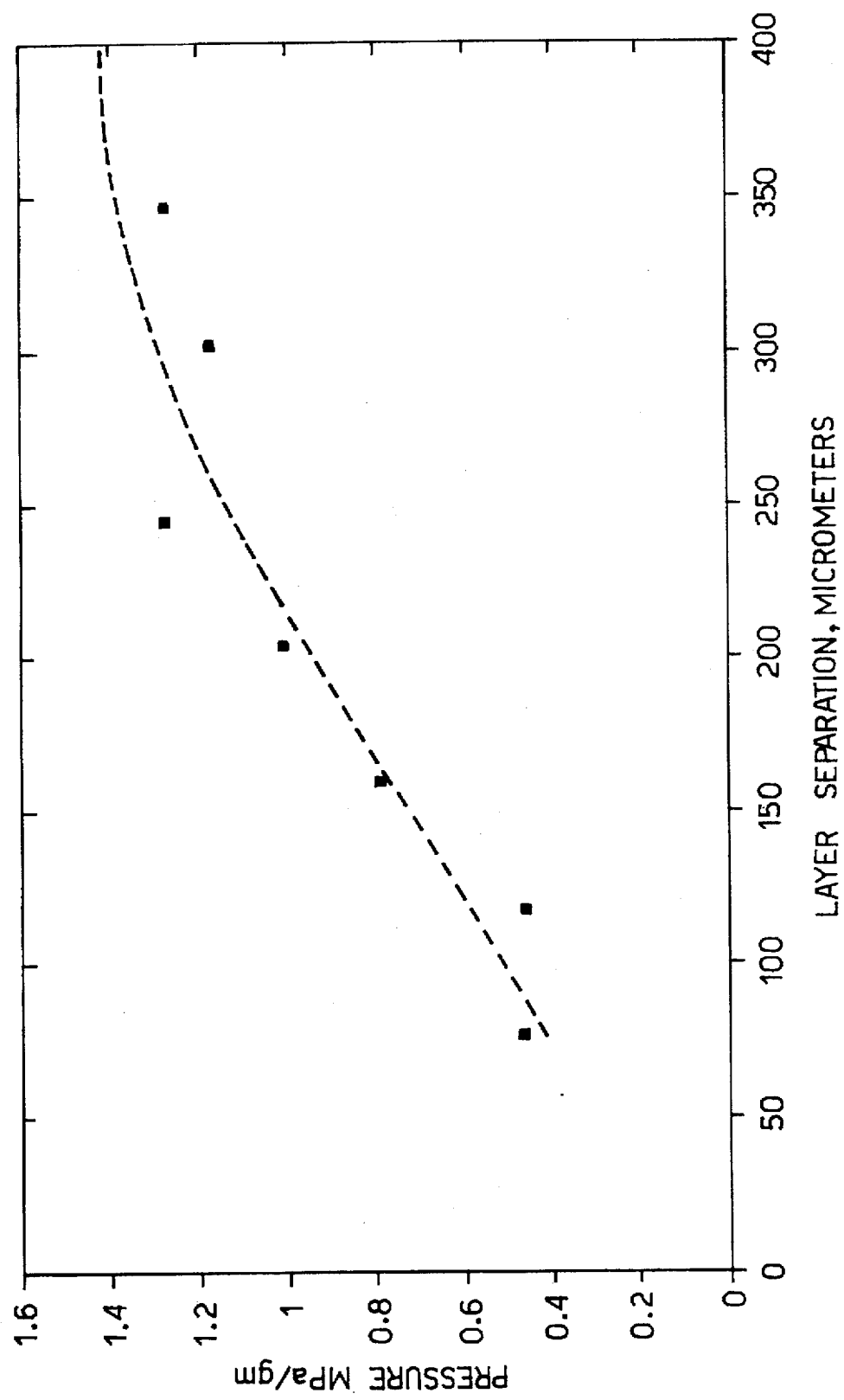

5,721,392

PYROTECHNIC IGNITION DEVICE

FIELD OF INVENTION

This invention relates tea pyrotechnic ignition device for use in an igniferous explosive train as an igniferous 'booster' device which is sufficiently sensitive to be ignited by a flame initiator device and sufficiently incendive to transmit a rapidly accelerating flame to a main charge of propellant material.

The device is especially advantageous for igniting gas-generating pyrotechnic propellant charges such as are used to inflate 'air-bags' in vehicle occupant restraint safety systems.

The invention also includes a gas generating device incorporating the pyrotechnic ignition device and a method of igniting a gas generating propellant charge using the ignition device.

BACKGROUND OF INVENTION

In European patent publication No. 505024 an ignition device for igniting a gas-generating charge for inflating an air-bag has been described, the device comprising a spirally wound tubular charge of sheeted pyrotechnic material wrapped around a co-axial former of circular cross-section. In use for igniting a gas-generating charge, the pyrotechnic charge of the device is ignited by an initiator such as a squib at an ignition position which is usually at one end (the ignition or trailing end) and burns in a downstream direction towards one or both ends (the leading end).

SUMMARY OF INVENTION

We have now found that the performance of such an ignition device may be improved if the pyrotechnic charge is shaped so that the inner surface of a portion of the device adjacent to the initiation position converges in the direction of burning.

Thus, in accordance with this invention a pyrotechnic ignition device comprises a hollow tubular coiled charge of pyrotechnic sheet material defining an ignition initiation position, the internal diameter of the coiled charge decreasing and the wall thickness increasing over at least a portion of said charge extending from said initiation position in the direction of burning. This configuration of the coiled pyrotechnic charge enhances the reliability of ignition from the initiator and rate of flame development on ignition of the coiled charge and also the speed and violence of burning of the charge. These effects are considered to be attributable to the lower thickness, and consequently fewer plies of sheeted pyrotechnic material at, and in the portion adjacent to, the initiation position, which reduces the confinement of the charge in this portion and allows the plies to be more readily separated at the edges by the impulse from an ignition initiation means. Thus the flame from the ignition initiation means, and subsequently generated flame from the burning coiled charge, can penetrate more easily between the plies and advance (flash-over) faster ahead of the burning front. The convergent configuration of the said charge portion ensures that the flame from the ignition initiator is confined and directed into the space between the plies and generally aids ignition and combustion of the pyrotechnic material adjacent to the initiator. Preferably adjacent plies of the coiled charge are spaced apart in order to increase the overall burning speed of the charge. The space between the plies of the coil may be provided by spacers separate or integral with the pyrotechnic sheet. Preferably the spacers are protrusions on the sheet which may conveniently be formed by embossing the sheet.

The leading end portions of the coiled pyrotechnic charge may be of uniform wall thickness. Preferably, however, the coiled pyrotechnic charge of the ignition device has a portion remote from the ignition initiation position which decreases in external diameter and wall thickness in a direction extending away from said ignition initiation position. This portion will usually be at the leading end of the pyrotechnic charge and its configuration, in operation, enhances the speed of the burning front travelling from the ignition device to a main propellant charge being ignited thereby. The speed and violence of burning of the main charge is consequently enhanced. This effect is also considered to be attributable to the number of plies in the coiled charge diminishing in the direction of advance of the burning front with consequent reduction of confinement on the coiled charge, thus enabling the plies to become separated more readily by the advancing flame at the coiled charge end to allow free passage for flame transmission from the coiled charge to the main charge.

Preferably at least a portion of the edge of the pyrotechnic charge at the said portion extending from the ignition initiation position, and preferably also at the said portion having decreasing external diameter, is fringed by cutting, notching or serrating, thereby enhancing the ease of ignition and/or the flame propagation of the charge.

The coiled pyrotechnic sheet material is preferably shaped so that the edges at the portions of decreasing diameter define helices. For convenience in design and manufacture it is generally preferred that both helices should have substantially the same pitch. In this case the coiled charge of pyrotechnic sheet material may conveniently be formed by winding a strip of material having opposed parallel edges to form a right cylindrical tubular coil with uniformly thick end portions and pushing or drawing out the coil axially from the centre in the direction of burning to form portions of tapering cross-section at each end, the interior surface of the portion adjacent to the intended ignition position converging in the direction away from the ignition position and the external surface of the portion at the opposite end converging towards that end of the charge. A pitch angle of about 10 to 15 degrees giving about 100–180 turns per metre for a wound charge having an outside diameter of 1.0 to 1.5 cm is generally convenient. The hollow pyrotechnic charge may be overwound on itself without a former, but it is generally preferred that it be wound on an axial former which may optionally be retained in the charge or withdrawn before the charge is ignited. The usual form of tubular former can be used but when the former is retained in the charge we have found that a tubular former significantly reduces the combustion rate. A much superior former is one having longitudinal external grooves or flutes. A former of star-shaped or cruciate cross-section, is especially advantageous. Preferably the former,is made of metal, conveniently steel.

The pyrotechnic charge is preferably encased in a perforated tubular container in order to provide confinement for the pyrotechnic charge of the ignition device, to direct the flame from an ignition initiator into the pyrotechnic charge and to spread the flame from the burning pyrotechnic charge throughout a main propellant charge being ignited by the ignition device. The tubular container is conveniently a metal tube, for example a steel tube, preferably having perforations of 1.5 to 3.0 mm diameter defining an open area of tube corresponding to 10 to 50 $mm^2$/gram of charge and preferably about 20 to 40 $mm^2$/gram. Alternatively the pyrotechnic charge may, if desired, be encased in a tube formed from gas-generating propellant material, for example in the form of annular or toroidal grains stacked end-to-end to define a tubular co-axial casing to accommodate the pyrotechnic charge. The casing of propellant material may serve as part or all of the gas-generating material of an 'air-bag' inflation device.

Preferred pyrotechnic sheet material consists of one or more substrate layers of oxidizing polymeric film having a layer of oxidizable material, preferably metal, on at least a portion of at least one surface of the, or each, substrate layer, the polymeric film and the oxidizable material being conjointly capable of reacting together exothermically on ignition as described in PCT International Publications Nos WO 90/10611 and WO 90/10724.

The preferred oxidizing substrate comprises polymeric film containing atoms chemically bound therein selected from the group consisting of halogens (especially fluorine), oxygen, sulphur, nitrogen and phosphorous. One preferred film substrate comprises fluoropolymer such as polytetrafluoroethylene (PTFE) which produces a high energy pyrotechnic sheet, but other suitable polymeric films include those comprising polychlorotrifluoroethylene, polyhexafluoropropylene, copolymers of trifluoroethylene and hexafluoropropylene, copolymers of trifluoroethylene and tetrafluoroethylene, copolymers of hexafluoropropylene and tetrafluoroethylene, copolymers of hexafluoropropylene and vinylidene fluoride, copolymers of tetrafluoroethylene and partially fluorinated propylene, copolymers of chlorotrifluoroethylene and vinylidene fluoride, homopolymers of partially fluorinated propylene, copolymers of partially fluorinated propylene and vinylidene fluoride, trichloroethylene homopolymers, copolymers of trichloroethylene and vinylidene fluoride, mixtures of two or more such polymers or mixtures of any one of such polymers with PTFE.

The polymeric film may optionally be a porous film, the pores advantageously occupying 6–95% of the film volume (i.e. porosity of 6–95%). Preferably the pores are vapour permeable pores containing at least part of the oxidizable material. Pyrotechnic sheet material comprising such porous film generally has faster burning rates than that containing only solid polymeric film.

A preferred pyrotechnic sheet of the invention has discontinuous portions in the oxidizing substrate and/or the layer of oxidizable material, preferably in the oxidizable material, these portions having flame-permeable apertures through which the interface between the oxidizing substrate and the oxidizable material is exposed as described in European patent publication no 0645354 which is incorporated herein by reference. Such exposure of portions of the interface enhances the ease of ignition and rate of combustion of the pyrotechnic sheet. In an especially preferred pyrotechnic sheet the substrate and the oxidizable material are permanently deformable and have different strain-for-rupture values thereby enabling one of the materials to be ruptured by stretching to expose flame-permeable apertures at the interface. The stretching may advantageously be effected by stamping (embossing) protrusions on the contacting substrate and layer of oxidizable material, the protrusions subsequently serving as spacer elements to separate the plies of the coiled charge and thereby enhance the rate of combustion of the pyrotechnic sheet material.

The oxidizable material may advantageously comprise metal selected from the group consisting of lithium, sodium, magnesium, beryllium, calcium, strontium, barium, aluminium, titanium, zirconium and alloys thereof, which metal may advantageously be deposited on the substrate by vapour deposition or magnetron sputtering. A metal layer is especially advantageous as it significantly enhances the dimensional stability of the pyrotechnic sheet and is easily ruptured. A most preferred metal for high heat generation is magnesium or an alloy thereof preferably coated on to a substrate film comprising fluoropolymer. Preferably the ratio of metal to the substrate of oxidizing polymeric film is substantially stoichiometric or there is a small excess of metal at the location of the film underlying the metal. The reaction between PTFE and magnesium can be represented empirically as

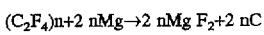

$(C_2F_4)n + 2\,nMg \rightarrow 2\,nMgF_2 + 2\,nC$

This reaction releases 5.98 megajoules/kilogram of reactant pyrotechnic material.

The rate of energy release on ignition varies inversely with the thickness and directly with the porosity of the pyrotechnic sheet material and, accordingly, the thickness and porosity will be chosen to attain the desired energy release. Thus the preferred polymeric film will generally have an areal mass of 10 to 150 g/m$^2$, typically 25–75 g/m$^2$ and the total amount of the oxidizable material will be equivalent to a laminar thickness of 2 to 30 µm, typically 4 to 15 m.

A typical pyrotechnic sheet comprises a film of halogenopolymer 3 to 50 µm, (preferably 10–30 µm) thick having on at least one side a vapour-deposited layer of magnesium 2 to 40 µm (preferably 4–15 µm) thick.

Pyrotechnic sheet material wherein the oxidizing polymeric film is halogenated polymeric film containing little, if any, hydrogen and the oxidizable material is a metal such as magnesium produces substantially only solid products on ignition and may be especially advantageous in certain applications, such as air-bag inflation, where blast effects must be avoided.

In use in an air-bag inflation device the pyrotechnic ignition device is disposed in ignition transmission relationship with a main gas-generating propellant charge and the coiled charge of pyrotechnic sheet material is ignited at the ignition point by a flame initiator. The main propellant charge may be any propellant which is suitable for use in vehicle occupant passive restraint systems, for example compositions comprising mixtures of sodium azide and metal oxide. The initiator may, for example, be a squib, shock tube, exploding bridge wire, a semi-conductor bridge, a spark discharge, an electric current or a hot wire.

Accordingly the invention also includes a gas-generating device comprising a pyrotechnic ignition device as described herein in operative combination with a flame initiator for igniting the pyrotechnic sheet material and a main charge of gas-generating propellant material ignitable by the pyrotechnic sheet material.

From a further aspect the invention consists in a method of igniting a gas-generating propellant charge wherein a pyrotechnic ignition device comprising a tubular coiled charge of pyrotechnic sheet material defining an ignition initiation position, the internal diameter of the charge decreasing and the wall thickness increasing over at least a portion thereof extending from the ignition initiation position in the direction of burning, is placed in ignition transmission relationship with the gas-generating propellant charge and the coiled charge of pyrotechnic sheet material is ignited at the ignition initiation position.

BRIEF DESCRIPTION OF THE DRAWINGS

The invention is further illustrated, by way of example only, with reference to the accompanying drawings wherein

FIG. 6 is a graph of combustion pressure v charge layer separation in the device of FIGS. 1–3.

DETAILED DESCRIPTION OF THE DRAWINGS

Figure 1:
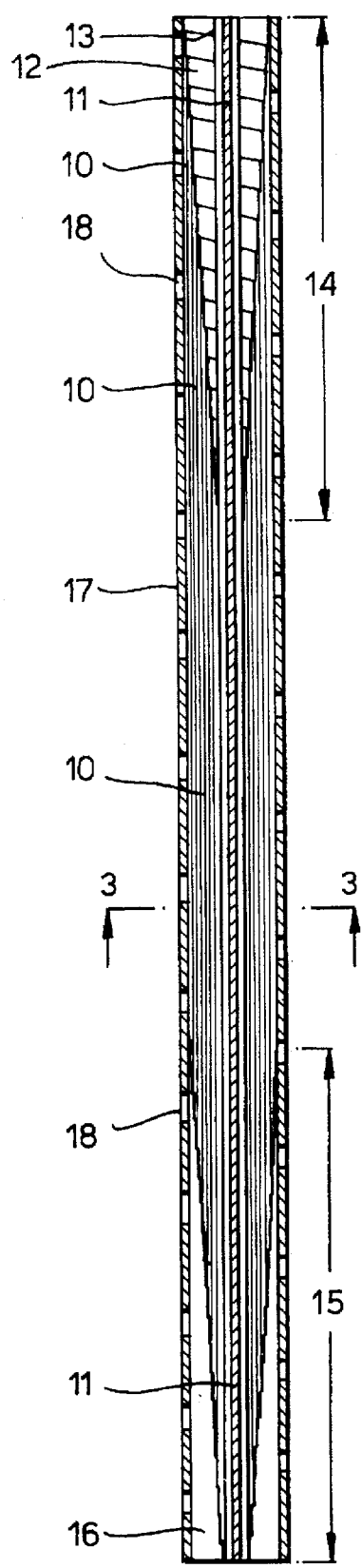
FIG. 1 shows diagrammatically a longitudinal medial cross-section of an ignition device in accordance with the invention.
Figure 2:
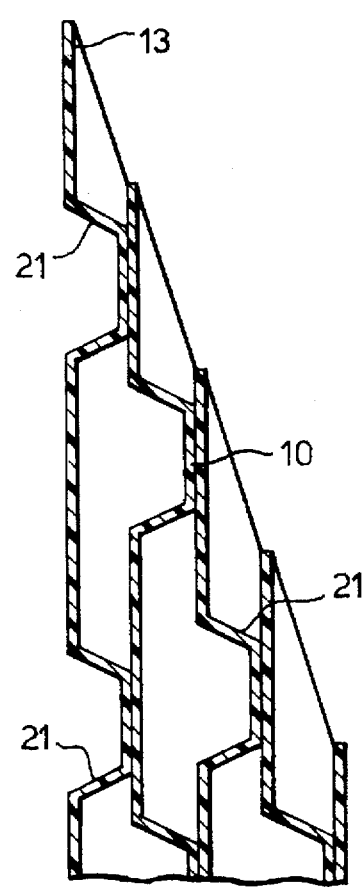
FIG. 2 shows diagrammatically a fragmentary end-section on a larger scale of the device of FIG. 1.
Figure 3:
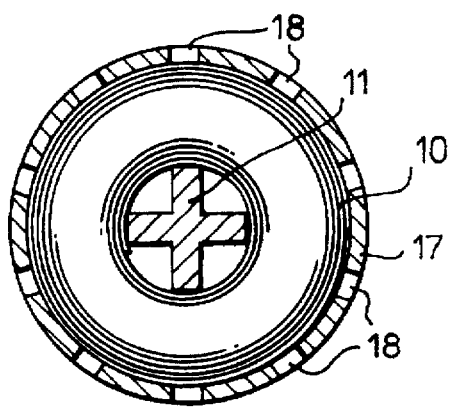
FIG. 3 shows diagrammatically a cross-section, on a larger scale, of the ignition device of FIG. 1 on the lines 3—3 of FIG. 1.

In the pyrotechnic ignition device shown in FIGS. 1–3 an area of pyrotechnic sheet in the shape of a parallelogram with two adjacent sides defining an angle of about 65°–80° is wound as a tubular helical coil(10) around an elongated axial former (11) of cruciate cross-section with the coil end edges defining helices co-axial with the former (11). The sheet is formed with regularly distributed protrusions (21) (dimples) on one side of the sheet which serve as spacers to maintain a space between the plies of the coil (10). One end (12) of the coil (10) defines an initiation position (13) and over a portion (14) of the coil extending from this end the diameter of the plies of the helix progressively decreases. Beyond this portion the internal diameter of the tubular coil (10) is uniform but over a portion (15) at the end (16) opposite the initiation end (12) the outside diameter progressively decreases towards the end (16). The coil (10) is enclosed in a closed-ended perforated tubular container (17) having apertures (18) extending through the container wall and spaced over the wall area to permit passage of flame to a main propellant charge (not shown) outside the container 17.

Figure 4:
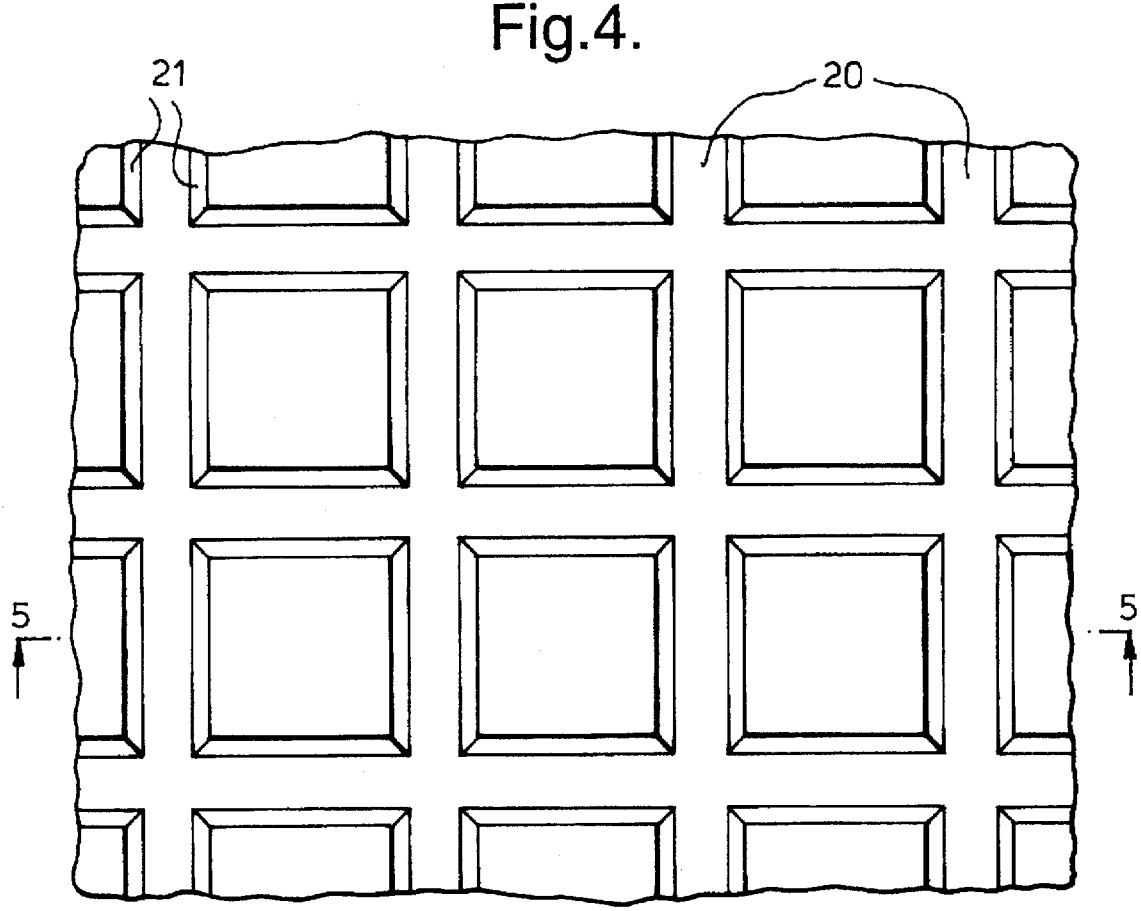
FIG. 4 shows diagrammatically a fragmentary plan view of pyrotechnic sheet material which is advantageous for use in the ignition device of FIG. 1.
Figure 5:
FIG. 5 is a diagrammatic cross-section on a portion of the line 4—4 of FIG. 4.

The pyrotechnic sheet material illustrated in FIGS. 4 and 5 consists of a basically flat sheet (20) comprising a layer of oxidizing polymeric film coated on each side with a layer of oxidizable material, a layer on the upper surface and a layer on the bottom surface. The sheet (20) has regularly spaced rows of hollow square-based dimples (21) of rectangular cross-section embossed thereon, the top of each dimple being slightly narrower than the base as shown in FIG. 5. The dimple configuration ensures that when one portion of a sheet (20) is overlaid on another identical portion of sheet, as for example when two sheets are overlaid in contact or when a single sheet is spirally wound with the turns of the sheet in contact, a space is maintained between adjacent surfaces of the sheet. When the pyrotechnic sheet is ignited, flame and combustion products can travel through this space ahead of the burning front to ignite the sheet at downstream positions, thereby effecting very rapid, substantially simultaneous, ignition of a large area of the sheet.

The upper layer of oxidizable material has narrow cracks along the upper periphery and side outer corners of the dimples, the cracks providing flame-permeable apertures through which portions of the interface between the oxidizing polymeric film and the layer of the oxidizable material is exposed, thereby enhancing the ease of igntion and rate of combustion of the pyrotechnic sheet.

In use in an air-bag inflator the ignition device is inserted into a main-charge of gas-generating propellant and ignited by an ignition initiator (not shown) at the initiation position (13). The flame rapidly advances through the coiled coil (10) to reach the end (15), transmitting flame to, and igniting the main charge propellant as it progresses along the coil (10).

The plies of coil (10) over the portions (14) and (15) become fewer and less confined towards the ends (12) and (16) and open up under the pressure from the impulse of the flame from the ignition initiation means and the burning of the coil (10) to allow easier passage of gas between the plies and consequently better initiation and faster burning at these end portions.

SPECIFIC EXAMPLES

The manufacture of the pyrotechnic ignition device of the invention is further described in the following specific examples.

Example 1

A pyrotechnic sheet was prepared by coating a 25 μm thick solid sheet of PTFE on each side with an 8.5 μm thick vapour-deposited layer of magnesium (approximately stoichiometric proportions). The coated sheet was embossed with regular rows of dimples by passing the sheet between a patterned metal roll and a plain rubber roll. The dimples were spaced at 3 mm centres in each direction and each dimple was approximately 0.75 mm square at the base, 0.5 mm square at the top, and 0.25 mm high. The upper layer of magnesium was thereby ruptured around the periphery of the top of the dimples to expose the oxidizing polymeric film at the magnesium/PTFE upper. interface, the width of the exposed areas being up to 10 ms. A parallelogram shaped 7 g sample with sides 38.1 cm and 13.3 cm long and an included angle of 76° was cut from a 13.7 cm wide strip of the prepared sheet and wound around a cruciate former 11 to form the coil (10). The former 11 was 22.5 cm long 6.0 mm diameter and had 4 longitudinal ribs 2.0 mm thick and 2.0 mm high. The coil (10) was co-extensive with the former and contained 14 turns of pyrotechnic sheet; the end edges of the sheet being helices, one internal and the other external, co-axial with the former (11) and extending along about 8.5 cm at each end of the coil (10).

The coiled sample was inserted into a perforated steel tube 14 mm outside diameter×23 cm long×0.3 mm wall thickness, the perforations being 2.7 mm diameter and occupying about 1% of the wall area. The assembled pyrotechnic ignition device was placed in a combustion test vessel (ballistic bomb) having a 35 cc plenum chamber and ignited by a squib at the end having the internal helical coil edge.

The pressure in the vessel after ignition was recorded. The maximum pressure was 13.5 MPa after 2.5 milliseconds. In a comparative experiment an ignition device containing a rectangular 7 g sample of the same strip of pyrotechnic sheet wound into a right cylindrical coil around a 6.0 mm diameter former as described above gave a maximum pressure of 11 MPa after 53 milliseconds.

These results clearly demonstrate the improved rate of gas production obtained by the helical winding of the coil of pyrotechnic sheet, as shown by the achievement of higher pressure per unit mass of pyrotechnic sheet in a substantially shorter time.

Example 2

A 7 g sample of pyrotechnic sheet was prepared, shaped and coiled as described in Example 1 but, additionally, the edge of the sample at the end having the internal helical edge (i.e. the ignition end), the edge was fringed by 2.5 cm deep cuts at 2 mm spacing. The sample was inserted in a perforated steel tube and burned in a combustion test vessel as described in Example 1. The maximum recorded pressure was 13.0 MPa after 1.7 milliseconds, showing an improvement in the rate of gas production over the result obtained in Example 1.

Example 3

A pyrotechnic sheet was prepared by coating a 25 μm thick solid sheet of PTFE on each side with an 8.5 μm thick vapour-deposited layer of magnesium (approximately stoichiometric proportions). The coated sheet was embossed with regular rows of dimples by passing the sheet between a patterned metal roll and a plain rubber roll. The dimples were spaced at 3 mm centres in each direction and each dimple was approximately 0.75 mm square at the base, 0.2 mm square at the top, and 0.3 mm high. A parallelogram shaped sample with sides 135 mm and 271 mm long and an included angle of 69 degrees was cut from a 126 mm wide strip of the prepared sheet. This sample was then wound around a 3 mm diameter former with controlled tension to obtain a finished coil (10) with an overall length of 229 mm and an outside diameter of 11mm with interply separation distance of 300 μm. The coil (10) was co-extensive with the former and contained 11 turns of pyrotechnic sheet; the long edges of the sheet being helices, one internal and the other external, co-axial with the former and extending along about 135 mm at each end of the coil (10). The former was then withdrawn from the coil (10) leaving a hollow core in the coil (FIG. 1 and FIG. 3).

The hollow-core, coiled sample(10) was inserted into a 12.7 mm diameter perforated steel tube (17) 260 mm long× 0.9 mm wall thickness, the perforations being 2.7 mm diameter and occupying about 1% of the wall surface area. The assembled pyrotechnic ignition device was placed in the centre of a cylindrical combustion test vessel (ballistic bomb) which simulates the physical dimensions of a typical passenger side airbag inflator. The propellant grains and filter normally used in an inflator were replaced with cores of nylon and stainless steel, respectively, with holes drilled into them to simulate the porosity of the real grains and filter elements. The resulting ballistic bomb had an effective free volume of 200 cc. The top and bottom portions of the tube (17) were inserted into the top and bottom covers of the vessel leaving an unsupported length of 235 mm. A squib was placed through the top cover into the end of the tube (17) facing the internal helical coil edge of the coiled sample (10).

The pressures in the tube (17) and in the ballistic bomb after ignition were recorded. The maximum pressure in the tube was 19.4 MPa after 1.2 milliseconds. The maximum pressure in the ballistic bomb was 3.25 MPa after 3.5 milliseconds.

Example 4

In a comparative experiment a rectangular sample, with sides 171 mm and 203 mm long and an included angle of 90 degrees embossed as described in Example 3, was wound on a 3 mm diameter former to obtain a coil with outside diameter of 9 mm diameter. The top and bottom ends of the coil had flush edges. This sample had a surface area, weight and interlayer separation distance (300 μm) identical to that of Example 3. The sample was inserted, without the former, into a perforated steel tube identical to that used in Example 3 and tested identically.

The pressures in the tube (17) and in the ballistic bomb after ignition were recorded. The first peak pressure in the tube was a very low value of 1.3 MPa at 1.675 milliseconds compared to the 19.4 MPa pressure after 1.2 milliseconds of Example 3. The maximum pressure in the ballistic bomb was 1.28 MPa reached at 45 milliseconds compared to the 3.25 MPa after only 3.5 milliseconds recorded in Example 3. These results demonstrate clearly the effect of the helical winding of the coil of pyrotechnic sheet to obtain the very high rate of gas production from this type of pyrotechnic sheet material.

Example 5

In a series of experiments where the parallelogram shaped samples, with sizes 132 mm and 369 mm long and an included angle of 75 degrees cut from 126 mm wide sheets embossed as in above examples, were wound in the 3 mm diameter former to obtain coils with outside diameters of 8,9, 10 and 11 mm diameter with the same overall length of 229 mm. The interlayer separation was thus varied from 76 to 204 μm. In another series of experiments parallelogram shaped samples with sides 139×222 mm, 135×270 mm and 133×319 mm with included angles of 66, 70 and 73 degrees respectively were cut from 126 mm wide sheets embossed as in above examples. These samples were wound in the same former to obtain coils with nearly identical outside diameters of about 11 mm and the same overall length of 229 mm. The interlayer separations for these coils varied from 245 to 34 μm. These two series of samples were inserted without the former, into perforated steel tubes identical to that used in Example 3 and tested identically. It was found that the maximum pressures, per unit weight of the pyrotechnic sheet used, varied with the interlayer separation as shown in FIG. 6. The time to reach the maximum pressure was found to be nearly constant at interlayer distance above 200 μm. However, it increased significantly below that distance. These results demonstrate the importance of controlling the winding tightness of the coil. Highest energy production rate can be obtained with interlayer separation above 250 μm.

We claim:

1. A pyrotechnic ignition device comprising a hollow tubular coiled charge of pyrotechnic sheet material defining an ignition initiation position, the internal diameter of the coiled charge decreasing and the wall thickness increasing over at least a portion of said charge extending from said initiation position in the direction of burning.

2. A device as claimed in claim 1 wherein the pyrotechnic sheet material has surface protrusions effective as spacer elements.

3. A device as claimed in claim 1 wherein the coiled pyrotechnic charge has a portion remote from the ignition initiation position which decreases in external diameter and wall thickness in a direction extending away from said ignition position.

4. A device as claimed in claim 3 wherein at least a portion of the edge of the pyrotechnic charge at said portion remote from the ignition initiation position which decreases in external diameter and wall thickness is fringed.

5. A device as claimed in claim 1 wherein at least a portion of the edge of the pyrotechnic charge at said portion of said charge extending from said ignition position in the direction of burning is fringed.

6. A device as claimed in claim 1 wherein the coiled pyrotechnic charge is shaped so that the edge at the portion of decreasing diameter defines a helix.

7. A device as claimed in claim 1 wherein the pyrotechnic sheet material consists of one or more substrate layers of oxidizing polymeric film, each of said one or more substrate layers of oxidizing polymer film having at least one surface, at least one of said one or the substrate layers of oxidizing film having a layer of oxidizable material on at least a portion of said at least one surface of the substrate layer, the polymeric film and the oxidizing polymer film being conjointly capable of reacting together exothermically on ignition.

8. A device as claimed in claim 7 wherein the said one or more substrate layers comprises polymeric film containing atoms chemically bound therein selected from the group consisting of halogens, oxygen, sulphur, nitrogen and phosphorous.

9. A device as claimed in claim 8 wherein the polymeric film comprises polymer selected from the group consisting of polytetrafluoroethylene, polychlorotrifluoroethylene, polyhexafluoropropylene, copolymers of trifluoroethylene and hexafluoropropylene, copolymers of trifluoroethylene and tetrafluoroethylene, copolymers of hexafluoropropylene and tetrafluoroethylene, copolymers of hexafluoropropylene and vinylidene fluoride, copolymers of tetrafluoroethylene and partially fluorinated propylene, copolymers of chlorotrifluoroethylene and vinylidene fluoride, homopolymers of partially fluorinated propylene, copolymers of partially fluorinated propylene and vinylidene fluoride, trichloroethylene homopolymers, copolymers of trichloroethylene and vinylidene fluoride, and mixtures of two or more of such polymers.

10. A device as claimed in claim 8 wherein the polymeric film comprises a mixture of polytetrafluoroethylene with a polymer selected from the group consisting of polytrichlorotrifluoroethylene, polyhexafluoropropylene, copolymers of trifluoroethylene and hexafluoropropylene, copolymers of trifluoroethylene and tetrafluoroethylene, copolymers of hexafluoropropylene and tetrafluoroethylene, copolymers of hexafluoropropylene and vinylidene fluoride, copolymers of tetrafluoroethylene and partially fluorinated propylene, copolymers of chlorotrifluoroethylene and vinylidene fluoride, homopolymers of partially fluorinated propylene, copolymers of partially fluorinated propylene and vinylidene fluoride, trichloroethylene homopolymers, and copolymers of trichloroethylene and vinylidene fluoride.

11. A device as claimed in claim 7 wherein the polymeric film comprises porous polymeric film having a porosity of 6–95%.

12. A device as claimed in claim 11 wherein the polymeric film comprises vapour permeable pores containing at least part of the oxidizing material.

13. A device as claimed in claim 7 wherein the pyrotechnic sheet material has discontinuous portions in the substrate layer of oxidizing polymeric film and/or the oxidizable material, said portions having flame-permeable apertures through which the interface between the oxidizing substrate and the oxidizable material is exposed.

14. A device as claimed in claim 7 wherein the oxidizable material comprises metal selected from the group consisting of lithium, sodium, magnesium, beryllium, calcium, strontium, barium, aluminium, titanium, zirconium and alloys thereof.

15. The device as claimed in claim 14 wherein the oxidizable material is a vapour-deposited layer.

16. The device as claimed in claim 14 wherein the oxidizable material comprises magnesium and the oxidizing polymeric film comprises a fluoropolymer.

17. A device as claimed in claim 7 wherein the pyrotechnic sheet material comprises a film of halogenopolymer 3 to 50 μm thick having on said at least one surface a vapour-deposited layer of magnesium 2 to 40 μm thick.

18. A gas-generating device comprising a pyrotechnic ignition device as claimed in claim 1 in operative combination with a flame initiator for igniting the charge of pyrotechnic sheet material and a main charge of gas-generating propellant material ignitable by said charge of pyrotechnic sheet material.

19. A method of igniting a gas-generating propellant charge wherein a pyrotechnic ignition device as claimed in claim 1 is placed in ignition transmission relationship with the gas-generating propellant charge and the coiled charge of pyrotechnic sheet material is ignited at the ignition initiation position.

20. A pyrotechnic ignition device comprising a hollow tubular coiled charge of pyrotechnic sheet material defining an ignition initiation position, the internal diameter of the coiled charge decreasing and the wall thickness increasing over at least a portion of said charge extending from said initiation position in the direction of burning, said hollow tubular coiled charge of pyrotechnic sheet material comprising a multiplicity of plies, wherein adjacent plies are spaced apart.

21. A device as claimed in claim 20 wherein the pyrotechnic sheet material has surface protrusions effective as spacer elements.

22. A pyrotechnic ignition device comprising a hollow tubular coiled charge of pyrotechnic sheet material defining an ignition initiation position, the internal diameter of the coiled charge decreasing and the wall thickness increasing over at least a portion of said charge extending from said initiation position in the direction of burning, said hollow tubular coiled charge of pyrotechnic sheet material comprising a multiplicity of plies, wherein the coiled pyrotechnic charge has a portion remote from the ignition initiation position which decreases in external diameter and wall thickness in a direction extending away from said ignition position, wherein the pitch of the edge portion of the charge extending from the initiation position and the pitch of the edge of said portion of the charge remote from the initiation portion are equal, the coiled charge being formed from a right cylindrical tubular coil by displacing said plies axially from the centre in the direction of burning.

* * * * *